Sept. 1, 1964  E. A. WHATELEY ETAL  3,146,637
CONTROL MEANS FOR EPICYCLIC POWER TRANSMISSION MECHANISMS
Filed Jan. 3, 1962
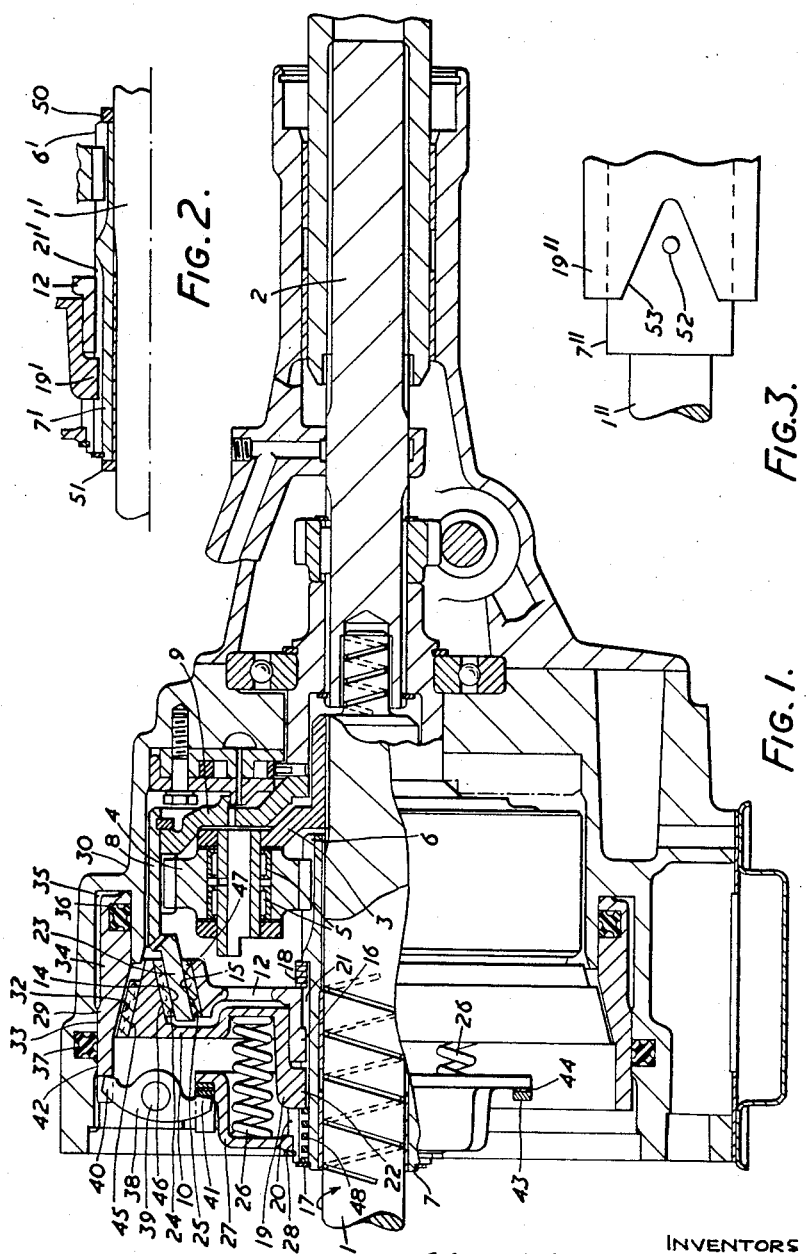
INVENTORS
ERIC ALBERT WHATELEY and
SYDNEY HENRY ASHBY
BY
Watson Leavenworth and Kelton
ATTORNEYS United States Patent Office 3,146,637
Patented Sept. 1, 1964

3,146,637
CONTROL MEANS FOR EPICYCLIC POWER
TRANSMISSION MECHANISMS
Eric Albert Whateley and Sydney Henry Ashby, both of
Coventry, England, assignors to Auto Transmissions
Limited, Coventry, England
Filed Jan. 3, 1962, Ser. No. 164,035
Claims priority, application Great Britain Jan. 3, 1961
19 Claims. (Cl. 74—781)

This invention relates to control means of the friction clutch type for variable speed epicyclic power transmissions comprising the usual basic epicyclic elements, namely a sun pinion, an internally toothed annulus and planet pinions engaging the sun pinion and the annulus. The invention is of particular, though by no means exclusive, application to overdrive and underdrive mechanisms for motor vehicle transmission systems.

Control means in accordance with one feature of the invention comprise the combination of two coaxial clutch members connected in the drive sense to one epicyclic element of the associated mechanism and respectively presenting two facing clutch surfaces, spring means acting on said clutch members, an associated clutch member connected in the drive sense to a further epicyclic element presenting two clutch surfaces and adapted to be gripped between said facing clutch surfaces under the action of said spring means acting on said two clutch members to provide one drive ratio, an annular brake member which is slidably and non-rotatably mounted for braking engagement with one of said two clutch members to provide an alternative drive ratio, and means for imparting axial movement to said annular brake member and the other of said two clutch members at the same time in a manner which relieves said associated clutch member from clutching engagement with said two clutch members and engages the annular brake member with said one clutch member.

Preferably the two coaxial clutch members are clutch discs of different diameters, respectively having inner and outer peripheral clutch surfaces forming said facing clutch surfaces. They may be connected to the sun pinion of the mechanism, and the annular brake member is conveniently formed for clutching engagement with the outer periphery of the larger clutch disc.

The associated clutch member may be connected in the drive sense to the annulus corresponding to the sun pinion with which the clutch discs are connected, and it may be formed as an integral annular extension of that annulus.

The means for imparting axial movements preferably comprise a fluid-pressure operated annular piston, and the piston may be formed integrally with the annular brake member for direct displacement of the latter. Rocker levers may be provided which are moved by the annular brake member and in turn act to produce the necessary simultaneous movement of the smaller clutch disc out of clutching engagement with the annular extension of the annulus, engagement of the annular brake member and the larger clutch disc serving to displace the latter from clutching engagement with the annulus extension. Thus a smooth ratio change with sustained power is obtained during transfer from one clutch condition to the other, i.e. between the two corresponding drive ratios.

Thus according to another feature of the invention control means for an epicyclic power transmission mechanism comprise an extension of one element of the mechanism, or an associated member connected thereto, which for one drive ratio is gripped between two relatively movable clutch members urged together by spring means, an axially movable brake member arranged to provide an alternative ratio as a result of braking engagement with one of said two clutch members, and means for producing axial movement of said brake member into engagement with said one clutch member in a manner which also displaces the latter from clutching engagement with the extension or associated member and produces simultaneous axial displacement of the other of said two clutch members from clutching engagement with the extension or associated member.

Preferably the arrangement is such that the spring force urging the two clutch members or discs together to clutch the annulus to the sun pinion is augmented by the application of an additional axial force to at least one of those clutch members or discs when the mechanism is transmitting torque. The axial force may result from the torque exerted by the sun pinion and be directly dependent thereon, so that the total clutch engaging force increases with torque loading.

The sun pinion may be mounted with a degree of freedom of axial movement and have helically cut teeth, so that transmission of torque by the pinion tends to produce axial displacement of the latter which is suitably connected to the clutch discs. The arrangement may be such that the sun pinion when transmitting torque applies the necessary axial force alternatively to one or other of the clutch discs according to whether the power is being transmitted in the forward or reverse direction. The sun pinion may be formed on or secured to a sleeve carried by the input shaft, the clutch discs being mounted on the sleeve so that they are subject to the axial forces on the sleeve exerted by the pinion.

Alternatively, the sun pinion and sleeve may be located in the axial sense and the clutch discs slidably mounted on the sleeve and coupled thereto by helically cut splines which, on transmission of torque, apply an axial force assisting the clutching engagement of the discs. In another arrangement in which the sun pinion and sleeve are axially located, one of the clutch discs is mounted on the sleeve and coupled thereto by a peg which projects radially from the sleeve and engages a V-shaped slot in a central sleeve portion of one of the clutch discs which is slidably mounted on the pinion sleeve. With this arrangement the peg tends to ride up one side or other of the V to produce an axial clutch assisting force on the corresponding clutch disc when torque is transmitted in either drive direction.

The invention will now be further described with reference to the accompanying drawings which illustrate, by way of example, an overdrive mechanism utilising control means in accordance with the invention and two modifications thereof, and in which:

FIGURE 1 is a view of the mechanism in axial cross-section,

FIGURE 2 is a detail view of one of the modifications, and

FIGURE 3 is a detail view of the other modification.

Referring to FIGURE 1, the overdrive mechanism has an input shaft 1 and an externally splined output or tail shaft 2 connected through the epicyclic elements of the mechanism. These elements comprise a planet pinion carrier 3 mounted on the inner end of the shaft 1 and carrying a series of similar planet pinions 4, each of which is rotatably mounted by means of needle bearings 5 on the carrier 3, a sun pinion 6 formed on the inner end of a sleeve 7 mounted on the shaft 1, and an internally toothed annulus 8 secured to a disc 9 mounted on the inner end of the output shaft 2. Each of the planet pinions 4 is in meshing engagement with the sun pinions 6 and the annulus 8, and the gear teeth are helically cut.

Control means of the mechanism comprise two coaxial clutch members in the form of a larger clutch disc 10 and a smaller clutch disc 12 which respectively have inner and outer facing clutch surfaces 14 and 15. The clutch disc 12 is formed integrally with a sleeve 16 which is slidably and non-rotatably mounted on the sleeve 7, sliding movement of the sleeve 16 being limited in one axial direction by a circlip 17 and in the opposite axial direction by an axially compressible spring sleeve 18 let into the sleeve 7. The disc 10 is formed integrally with a sleeve 19 which is slidably mounted and splined on the sleeve 16, the latter sleeve having axial through slots such as 20 through which project radial tongues such as 22 from the sleeve 19 for engagement with the straight-cut spline 21 in the innermost sleeve 7.

The annulus 8 is formed with an axially directed extension 23 forming an integral associated clutch member of truncated conical form having outer and inner peripheral surfaces, respectively 24 and 25, adapted to be gripped between the clutch surfaces 14 and 15 provided by the rims of the clutch discs 10 and 12. The initial gripping action is effected by spring means comprising a ring of springs such as 26 which are arranged in compression between the disc 10 and a spring carrier 27 mounted on the outer end of the sleeve 16 and held thereon by a circlip 28. Thus the springs 26 urge the clutch disc 10 to the right, as shown in FIGURE 1, into clutching engagement with the extension 23 and at the same time urge the sleeve 16 and the clutch disc 12 in the opposite direction, so that the extension 23 is effectively gripped between the clutch surfaces 14 and 15.

An annular and axially movable brake member 29 is slidably and non-rotatably mounted in a housing 30 of the mechanism, and the member 29 is provided with an inner peripheral brake surface 32 of truncated conical form adapted for engagement with an outer peripheral brake surface 33 on the larger clutch disc 10. The annular member 29 is also formed integrally with an annular hydraulic piston 34 contained in an annular hydraulic cylinder 35 formed in the housing 30. Resilient lip-type seals 36 and 37 are respectively recessed into the piston 34 and the wall of the cylinder 35 to provide an efficient seal for the piston 34 within the cylinder.

A ring of radially disposed rocker levers such as 38 are mounted in the housing 30 on fixed pivot pins 39, and each of these levers has a radially outer arm 40 and a radially inner arm 41. The outer arms 40 are engaged by an annular projection 42 from the brake member 29, and the inner arms 41 bear against a light alloy thrust ring 43 which acts on the spring carrier 27 which is also of light alloy through a hardened steel thrust washer 44.

To provide the desired frictional characteristics the three frictional surfaces of the clutch discs 10 and 12 are respectively provided with facings 45, 46 and 47 of suitable material. The splines 21 are cut away at the outer end of the piston sleeve 7, a further spring sleeve 48 being arranged between the adjacent end of the sleeve 19 and the circlip 17.

During operation of the mechanism the action of the control means is as follows. When it is required to drive the input and output shafts 1 and 2 at the same speed, the extension 23 of the annulus 8 is gripped between the clutch discs 10 and 12 under the action of the clutch springs 26. This connects the sun pinion 6 to the annulus 8 and locks the epicyclic elements of the mechanism so that the two shafts rotate together.

When it is desired to utilise the mechanism as an overdrive, i.e. to drive the output drive shaft 2 at a higher speed than the input shaft 1, hydraulic pressure is admitted to the cylinder 35 by operation of a hydraulic control valve, which is not illustrated, to move the piston 34 to the left as shown in FIGURE 1. The effect of this is to bring the brake surface 32 of the annular brake member 29 into engagement with the outer surface 33 of the clutch disc 10, at the same time producing axial displacement of the disc 10 out of clutching engagement with the annular extension 23. Simultaneously, displacement of the projection 42 moves the rocker levers 38 to displace the spring carrier 27 to the right and with it the clutch disc 12. Thus the disc 12 is also displaced axially out of clutching engagement with the extension 23 and the springs 26 now provide an axial force urging the clutch disc 10 into clutching engagement with the annular brake member 29.

As the annular brake member 29 is non-rotatably mounted in the housing 30 it forms, in effect, a brake ring which acts to brake the sun pinion 6 when hydraulic pressure is admitted to the cylinder 35 as described. An important feature of the arrangement is that as the brake member 29 engages the clutch disc 10 to brake the sun pinion 6, the disc 10 and the disc 12 are simultaneously disengaged from the extension 23 to free the annulus 8. Thus a simple power-sustained ratio change is obtained between the direct drive condition and the overdrive condition produced when the sun pinion 6 is braked.

When it is desired to return to the straight-through or direct drive condition the pressure in the hydraulic cylinder 35 is relieved and the springs 26 revert to their original function of causing the extension 23 to be gripped between the clutch discs 10 and 12 to lock the epicyclic elements. Return movement of the spring carrier 27 produces return movement of the rocker levers 38 to return the piston 34 to the resting position within the cylinder 35. In this position, as shown in FIGURE 1, a small clearance exists between the brake surfaces 32 and 33.

When the mechanism is transmitting torque the helical tooth form of the sun pinion 6 results in an axial force tending to produce endwise movement of the sleeve 7 on which the pinion 6 is formed. In forward drive this axial force is applied to the clutch disc 10 through the sleeve 48 in both the direct drive and the overdrive conditions, and urges that disc to the right as viewed in FIGURE 1. Thus in either drive ratio an axial force results from torque transmission in the forward drive direction which assists clutch engagement.

During overrun conditions the sun pinion 6 produces an axial force on the other clutch disc 12 through the sleeve 18, this force being active to increase the clutch engaging force of that disc and the extension 23 when in direct drive.

Referring now to the modifications shown somewhat diagrammatically in FIGURES 2 and 3, these show alternative ways of obtaining an additional clutch-engaging force when the mechanism is transmitting torque. In FIGURE 2 the sun pinion 6' has straight cut teeth and is axially located by thrust washers 50 and 51. The splines 21' on the sun pinion sleeve 7' are now helically cut and engage only the sleeve 19' of the larger clutch disc, so that when the mechanism is transmitting torque in the forward drive direction a clutch-assisting force is applied to that disc by the splines.

In the modification of FIGURE 3 the pinion sleeve 7" on which the sun pinion is formed is unsplined, the pinion teeth again being straight cut. A peg 52 fixed in the sleeve 7" projects radially from that sleeve into a V-shaped slot machined in the outer end of sleeve portion 19" of the clutch member 10. When the mechanism is transmitting torque, in either direction, the peg 52 engages one side or other of the slot 53 and hence applies an inward axial clutch-assisting force to the larger clutch disc.

We claim:

1. Control means for a variable speed epicyclic power transmission mechanism, comprising the combination of two coaxial clutch members connected in the drive sense to one epicyclic element of the associated mechanism and respectively presenting two facing clutch surfaces, spring means acting on said clutch members, an associated clutch member connected in the drive sense to a further epicyclic element presenting two clutch surfaces and adapted to be gripped between said facing clutch surfaces under the action of the spring means acting on said two clutch members to provide one drive ratio, an annular brake member which is slidably and non-rotatably mounted for braking engagement with one of said two clutch members to provide an alternative drive ratio, and means for imparting axial movement to said brake member and the other of said two clutch members at the same time in a manner which relieves said associated clutch member from clutching engagement with said two clutch members and engages the annular brake member with said one clutch member.

2. Control means according to claim 1, wherein the two coaxial clutch members are clutch discs of different diameters respectively having inner and outer peripheral clutch surfaces forming said facing clutch surfaces.

3. Control means according to claim 2, wherein the two coaxial clutch members are connected to the sun pinion of the mechanism.

4. Control means according to claim 1, wherein the annular brake member is formed for clutching engagement with the outer periphery of the one of said two clutch members.

5. In a variable speed epicyclic power transmission mechanism; control means comprising the combination of two coaxial clutch members connected in the drive sense to one epicyclic element of the associated mechanism and respectively presenting two facing clutch surfaces, spring means acting on said clutch members, an associated clutch member connected in the drive sense to an internally toothed annulus of said mechanism and presenting two clutch surfaces and adapted to be gripped between said facing clutch surfaces under the action of the spring means acting on said two clutch members to provide one drive ratio, an annular brake member which is slidably and non-rotatably mounted for braking engagement with one of said two clutch members to provide an alternative drive ratio, and means for imparting axial movement to said brake member and the other of said two clutch members at the same time in a manner which relieves said associated clutch member from clutching engagement with said two clutch members and engages the annular brake member with said one clutch member.

6. Control means according to claim 5, wherein the associated clutch member is an integral extension of the toothed annulus.

7. Control means according to claim 6, wherein said piston is formed integrally with the annular brake member.

8. Control means for an epicyclic power transmission mechanism, comprising an extension of one element of the mechanism which for one drive ratio is gripped between two relatively movable clutch members associated with another element of the mechanism and urged together by spring means, a further axially movable member arranged to provide an alternative ratio as a result of frictional engagement with one of said two clutch members, and means for producing axial movement of said further member into frictional engagement with said one clutch member in a manner which also displaces the latter from clutching engagement with said extension and produces simultaneously axial displacement of the other of said two clutch members from clutching engagement with the extension.

9. Control means according to claim 8, wherein said further member is an axially movable and non-rotatable annular brake member.

10. Control means according to claim 8, wherein said two clutch members are connected to a sun pinion of the mechanism corresponding to said annulus.

11. Control means according to claim 8, wherein said extension of said one element is formed by a separate member connected to that element.

12. Control means for a variable speed cyclic power transmission mechanism, comprising the combination of two coaxial clutch members connected in the drive sense to one epicyclic element of the associated mechanism and respectively presenting two facing clutch surfaces, spring means acting on said clutch members, an associated clutch member connected in the drive sense to a further epicyclic element presenting two clutch surfaces and adapted to be gripped between said facing clutch surfaces under the action of the spring means acting on said two clutch members to provide one drive ratio, the construction of the mechanism being such that when the latter is transmittting torque on additional axial force supplementing the spring force is applied to at least one of said two clutch members, an annular brake member which is slidably and non-rotatably mounted for braking engagement with one of said two clutch members to provide an alternative drive ratio, and means for imparting axial movement to said brake member and the other of said two clutch members at the same time in a manner which relieves said associated clutch member from clutching engagement with said two clutch members and engages the annular brake member with said one clutch member.

13. Control means according to claim 12, wherein said two clutch members are connected to the sun pinion and said axial force results from the torque exerted by the sun pinion and is directly dependent thereon.

14. Control means according to claim 13, wherein the sun pinion is mounted with a degree of freedom of axial movement and has helically cut teeth, so that transmission of torque by the pinion tends to produce axial displacement of the latter.

15. Control means according to claim 14, wherein the sun pinion when transmitting torque applies said additional axial force alternatively to one or other of said two clutch members according to whether the power is being transmitted in the forward or reverse direction.

16. Control means according to claim 14, wherein the sun pinion is formed on or secured to a sleeve carried by the input shaft, said two clutch members being mounted on the sleeve so that they are subject to axial forces on the sleeve exerted by the pinion.

17. Control means according to claim 13, wherein the sun pinion is formed on or secured to a sleeve which is located in the axial sense, said two clutch members being slidably mounted on the sleeve and coupled thereto by helically cut splines.

18. Control means according to claim 13, wherein the sun pinion is formed on or secured to a sleeve which is located in the axial sense, one of said two clutch members being mounted on the sleeve and coupled thereto by a peg which projects radially from the sleeve and engages a V-shaped slot in a central portion of that member.

19. In a variable speed epicyclic power transmission mechanism; control means comprising the combination of two coaxial clutch members connected in the drive sense to one epicyclic element of the associated mechanism and respectively presenting two facing clutch surfaces, spring means acting on said clutch members, an associated clutch member connected in the drive sense to a further epicyclic element presenting two clutch surfaces and adapted to be gripped between said facing clutch surfaces under the action of the spring means acting on said two clutch members to provide one drive ratio, an annular brake member which is slidably and non-rotatably mounted for braking engagement with one of said two clutch members to provide an alternative drive ratio, means for imparting axial movement to said brake member to produce said braking engagement, and pivotally mounted rocker levers which are moved by the brake member and in turn act to produce simultaneous movement of the other of said two clutch members out of clutching engagement with said associated clutch member.

References Cited in the file of this patent
UNITED STATES PATENTS

| | | |
|---|---|---|
| 2,136,971 | Fleischel | Nov. 15, 1938 |
| 2,510,469 | Greenlee | June 6, 1950 |
| 2,654,269 | Wilson | Oct. 6, 1953 |